June 26, 1951          W. T. HOLT          2,558,436
FISHING PLUG OR LURE
Filed April 12, 1949
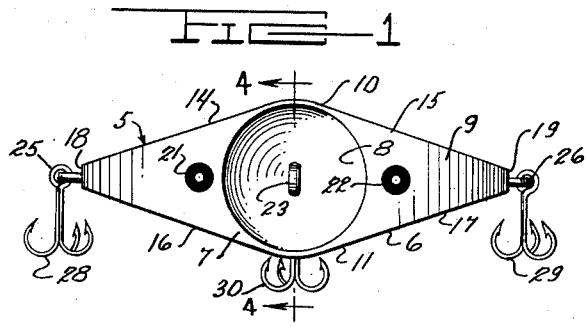
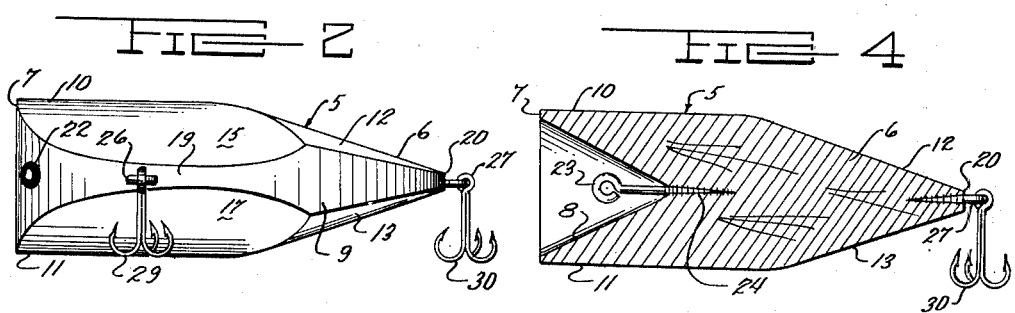
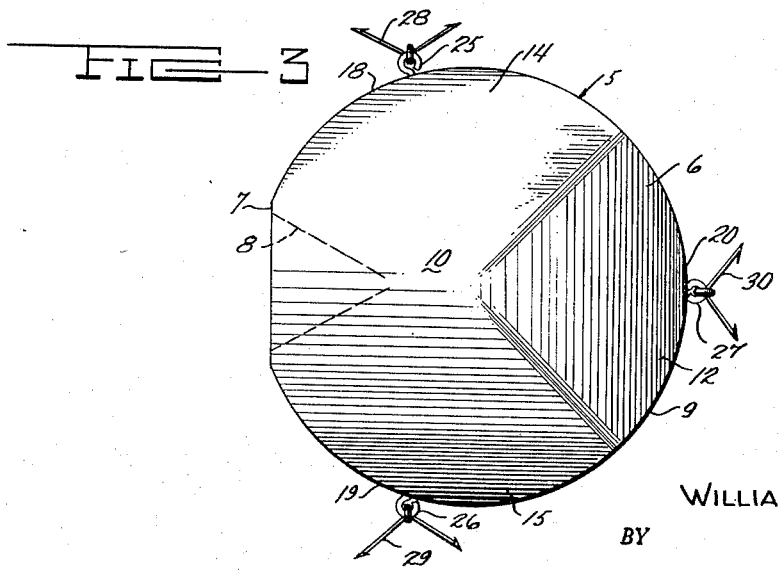
INVENTOR.
WILLIAM T. HOLT
BY
McMorrow, Berman & Davidson
ATTORNEYS Patented June 26, 1951

2,558,436

UNITED STATES PATENT OFFICE 2,558,436

FISHING PLUG OR LURE

William T. Holt, Jacksonville, Ark.

Application April 12, 1949, Serial No. 86,981

2 Claims. (Cl. 43—42.48)

This invention relates to artificial bait, such as fish lures, and particularly to a special plug or lure which is capable of displaying movements when drawn through the water on a substantially even keel.

The main object of my invention is to provide a special form of artificial bait which moves through the water at a low speed and is provided with hooks so exposed as to catch any fish that comes reasonably close to the lure.

Another object is to provide a wide fish lure with a largely-circular contour having a plurality of hooks pendently spaced about the periphery thereof and thus affording sufficient space between the hooks to attract fish from all directions and allow a plurality of fish to be caught individually on the hooks.

A further object is to have a fish lure of the character indicated formed with a forwardly-directed cavity for creating an eddy at the front of the lure in order to impede forward movement thereof and convert a portion of the movement into semi-rotary oscillation of the lure to simulate movements of a fish and thereby attract the attention of the fish in the water thereto.

It is also an object to have such a lure which is reasonably light, low in cost and effective in use.

Other objects and advantages of the invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a front elevation of a fish lure made according to the invention and embodying the same in a practical form;

Figure 2 is a side elevation of the same fish lure of Figure 1, as seen from the right in said figure;

Figure 3 is a plan view of the same fish lure as seen from above in Figure 2;

Figure 4 is a longitudinal and vertical sectional view taken on line 4—4 in Figure 1.

In the various views the same reference numerals indicate the same or like parts.

When fishing with a line, it is a well known fact that fish are attracted by very obvious movements of true or artificial bait and lures, and thus it is always desirable to be in a position to provide proper movement of a fish lure in the water without resorting to any particular expedients to provide the movement. By experience it has been ascertained that the lure need not resemble a fish in form, but rather it is more important that it should display movement which simulates lifelike movements of live bait in order to attract fish in the neighborhood to the lure. Although I am aware that various expedients have been resorted to in this field, I have found it possible to produce a special improved fish lure which has the added feature that, due to its movement, the lure tends to swing the hooks thereof outward into position most effective to catch the fish approaching the lure, as will now be particularly described.

Hence, in the practice of my invention, and referring again to the drawing, the fish lure, generally indicated at 5, primarily consists of a lure body 6 which when viewed from above, as in Figure 3, is largely circular in contour with a front end 7 cut to form a flat end from which a conical cavity extends rearwardly at 8 into the lure body 6. Thus, the flat front end 7 and the circular periphery 9 determine the outline or contour of the lure. The lure body 6 is formed with a first arcuate convex ridge on its top surface which extends longitudinally from the front end 7 and terminates at a point intermediate the front end 7 and the back end 20, and with a second arcuate convex ridge 11 on the bottom surface which extends longitudinally from the front end 7 and terminates at a point intermediate the front end 7 and the back end 20. The top surface of the lure body 6 slopes downwardly from the terminal point of the ridge 10 toward the back end 20 of the lure body which it intersects at an angle while the bottom surface of the lure body slopes upwardly from the termination point of the second named ridge 11 toward the back end 20 which it intersects at an angle. The top surface of the lure body 6 slopes downwardly from one side of the ridge 10 toward the adjacent side 18 which it intersects at an angle, this inclined portion of the lure body top surface being indicated by the numeral 14. On the opposite side of the ridge 10 the top surface slopes downwardly toward and intersects the adjacent side 19 at an angle, this inclined portion of the lure body top surface being indicated by the numeral 15. The bottom surface of the lure body 6 similarly slopes upwardly from one side of the ridge 11 toward and intersects the adjacent side 18 at an angle, such inclined portion being indicated by the numeral 16. On the opposite side of the ridge 11 the bottom surface similarly slopes upwardly toward and intersects the adjacent side 19 at an angle, this inclined portion being indicated by the numeral 17. The result of this structure is that the lure body 6 is narrowed at three spaced points, namely, at the sides 18 and 19 and at the back end 20. Upon the front end 7 at both sides of the conical cavity 8 are painted or otherwise applied a pair of simulated eyes 21 and 22.

In order to connect the lure to a fish line, the screw eye 23 formed with a relatively long shaft is screwed at 24 into the inner end of the cavity 8 so that the eye of the screw projects forwardly into the cavity. At each of the narrowed points, namely, sides 18 and 19 and back end 20 of the lure are secured additional screw eyes 25, 26, 27, to which the hooks 28, 29 and 30 are pivotally connected in depending position. When the line is connected to the internally-located screw eye 23 and the lure drawn through the water, eddies will be set up in the water in front of the forward end 7 of the lure body and will primarily impede movement of the latter through the water and at the same time will cause the body to begin to oscillate in a manner resembling that of a balance wheel on a vertical axis, which will automatically swing hooks 28, 29 and 30 outward repeatedly back and forth and by its movements will attract fish to the lure to be caught upon the hooks thereof.

The lure may, of course, be painted or enameled, if so desired, and the body 5 thereof may either be of wood or plastic, or of any suitable material, and made in various sizes for different fish.

Manifestly, variations may be resorted to and parts and features may be modified or used without others within the scope of the appended claims.

Having now fully described my invention, I claim:

1. A fish lure including a lure body having a substantially circular contour as viewed from above and provided with a cavity extending rearwardly into the lure body from the front end thereof, a line-attachment member located in the cavity for attaching said lure body to the fish line, the top surface of said body having a first ridge extending longitudinally from the front end of the body and terminating at a point intermediate the front and back ends of the body, the bottom surface of said body having a second ridge extending longitudinally from the front end of the body and terminating at a point intermediate the front and back ends of the body, the top surface of said body sloping downwardly from the terminal point of the first named ridge toward and intersecting the back end at an angle and the bottom surface of said body sloping upwardly from the terminal point of the second named ridge toward and intersecting the back end at an angle, the top and bottom surfaces of said body on opposed sides of said first named and said second named ridges being inclined toward and intersecting the adjacent side of the lure body at an angle, a hook pendently pivoted to each of the sides of said lure body, and a further hook pendently pivoted to the back end of said lure body.

2. A fish lure including a lure body having a substantially circular contour as viewed from above and provided with a cavity extending rearwardly into the lure body from the front end thereof, a line attachment member located in the cavity for attaching said lure body to a fish line, the top surface of said body having a first convex ridge extending longitudinally from the front end of the body and terminating at a point intermediate the front and back ends of the body, the bottom surface of said body having a second convex ridge extending longitudinally from the front end of the body and terminating at a point intermediate the front and back ends of the body, the top surface of said body sloping downwardly from the terminal point of the first named ridge toward and intersecting the back end at an angle, and the bottom surface of said body sloping upwardly from the terminal point of said second named ridge toward and intersecting the back end at an angle, the top surface of said body sloping downwardly from each side of said first named ridge toward and intersecting the adjacent side of said body at an angle, and the bottom surface of said body sloping upwardly from each side of said second named ridge toward and intersecting the adjacent side of said body at an angle, the bottom surface of said body sloping upwardly from each side of said second named ridge toward and intersecting the adjacent side of the lure body at an angle, a hook pendently pivoted to each of the sides of said lure body, and a further hook pendently pivoted to the back end of said lure body.

WILLIAM T. HOLT.

REFERENCES CITED

The following references are of record in the file of this patent:

UNITED STATES PATENTS

| Number | Name | Date |
|---|---|---|
| 1,153,478 | Wilson | Sept. 14, 1915 |
| 1,602,329 | Bonnett | Oct. 5, 1926 |
| 2,033,829 | Helin | Mar. 10, 1936 |